(12) United States Patent  
Weder

(10) Patent No.: US 6,192,626 B1  
(45) Date of Patent: *Feb. 27, 2001

(54) COVERING FOR FLOWER POT AND FLORAL GROUPING

(75) Inventor: Donald E. Weder, Highland, IL (US)

(73) Assignee: Southpac Trust Int'l, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/436,451

(22) Filed: Nov. 9, 1999

Related U.S. Application Data

(63) Continuation of application No. 09/325,238, filed on Jun. 3, 1999, which is a continuation of application No. 09/021,215, filed on Feb. 10, 1998, now Pat. No. 6,061,958, which is a continuation of application No. 08/971,206, filed on Nov. 14, 1997, now Pat. No. 5,956,898, which is a continuation of application No. 08/526,335, filed on Sep. 11, 1995, now Pat. No. 5,699,648, which is a continuation of application No. 08/183,010, filed on Jan. 14, 1994, now Pat. No. 5,479,758, which is a continuation of application No. 08/001,001, filed on Jan. 6, 1993, now Pat. No. 5,307,606.

(51) Int. Cl.⁷ .................................................. B65D 85/52
(52) U.S. Cl. .................................................. 47/72
(58) Field of Search .................... 47/72, 41, 58, 47/66, 84

(56) References Cited

U.S. PATENT DOCUMENTS

| Re. 21,065 | 5/1939 | Copeman ............................. 93/2 |
| D. 259,333 | 5/1981 | Charbonneau ................. D9/306 |
| D. 279,279 | 6/1985 | Wagner ............................ D11/143 |
| D. 301,991 | 7/1989 | Van Sant ......................... D11/149 |
| D. 335,105 | 4/1993 | Ottenwalder et al. ........ D11/164 |
| D. 368,025 | 3/1996 | Sekerak et al. ............... D9/305 |
| 524,219 | 8/1894 | Schmidt . |
| 732,889 | 7/1903 | Paver . |
| 950,785 | 3/1910 | Pene . |
| 1,063,154 | 5/1913 | Bergen . |
| 1,446,563 | 2/1923 | Hughes . |
| 1,520,647 | 12/1924 | Hennigan . |
| 1,525,015 | 2/1925 | Weeks . |
| 1,610,652 | 12/1926 | Bouchard . |
| 1,697,751 | 1/1929 | Blake ............................... 229/87 |
| 1,863,216 | 6/1932 | Wordingham . |
| 1,978,631 | 10/1934 | Herrlinger ....................... 91/68 |
| 2,048,123 | 7/1936 | Howard .......................... 229/87 |
| 2,170,147 | 8/1939 | Lane ................................ 206/56 |
| 2,200,111 | 5/1940 | Bensel .......................... 229/1.5 |
| 2,278,673 | 4/1942 | Savada et al. ................. 154/43 |
| 2,302,259 | 11/1942 | Rothfuss ......................... 41/10 |
| 2,323,287 | 7/1943 | Amberg ......................... 229/53 |

(List continued on next page.)

FOREIGN PATENT DOCUMENTS

| 4231978 | 6/1979 | (AU) . |
| 654427 | 1/1965 | (BE) . |
| 560532 | 4/1975 | (CH) . |

(List continued on next page.)

OTHER PUBLICATIONS

Speed Cover Brochure, "Simple Solution For Those Peak Volume Periods", Highland Supply Corporation, ©1989.

"Speed Sheets and Speed Rolls" Brochure, Highland Supply Corporation, ©1990.

"Color Them Happy with Highlander Products" ©1992.

(List continued on next page.)

Primary Examiner—Peter M. Poon  
Assistant Examiner—Elizabeth Shaw  
(74) Attorney, Agent, or Firm—Dunlap, Codding & Rogers

(57) ABSTRACT

A cover for use with a flower pot having a floral grouping disposed therein. The cover includes a sheet of material having a sheet extension connected to an outer peripheral surface thereof. The sheet of material is formed into a pot cover for covering the flower pot and the sheet extension extends over the floral grouping.

4 Claims, 2 Drawing Sheets

U.S. PATENT DOCUMENTS

| | | | |
|---|---|---|---|
| 2,355,559 | 8/1944 | Renner | 229/8 |
| 2,371,985 | 3/1945 | Freiberg | 206/46 |
| 2,411,328 | 11/1946 | MacNab | 33/12 |
| 2,510,120 | 6/1950 | Leander | 117/122 |
| 2,529,060 | 11/1950 | Trillich | 117/68.5 |
| 2,621,142 | 12/1952 | Wetherell | 154/117 |
| 2,648,487 | 8/1953 | Linda | 229/55 |
| 2,688,354 | 9/1954 | Berger | 150/28 |
| 2,774,187 | 12/1956 | Smithers | 47/41 |
| 2,822,287 | 2/1958 | Avery | 117/14 |
| 2,846,060 | 8/1958 | Yount | 206/58 |
| 2,850,842 | 9/1958 | Eubank, Jr. | 47/58 |
| 2,883,262 | 4/1959 | Borin | 21/56 |
| 2,989,828 | 6/1961 | Warp | 53/390 |
| 3,022,605 | 2/1962 | Reynolds | 47/58 |
| 3,080,680 | 3/1963 | Reynolds | 47/37 |
| 3,094,810 | 6/1963 | Kalpin | 47/37 |
| 3,121,647 | 2/1964 | Harris et al. | 118/202 |
| 3,130,113 | 4/1964 | Silman | 161/97 |
| 3,271,922 | 9/1966 | Wallerstein et al. | 53/3 |
| 3,322,325 | 5/1967 | Bush | 229/62 |
| 3,376,666 | 4/1968 | Leonard | 47/41 |
| 3,380,646 | 4/1968 | Doyen et al. | 229/57 |
| 3,431,706 | 3/1969 | Stuck | 53/390 |
| 3,508,372 | 4/1970 | Wallerstein et al. | 53/3 |
| 3,510,054 | 5/1970 | Sanni et al. | 229/66 |
| 3,512,700 | 5/1970 | Evans et al. | 229/53 |
| 3,552,059 | 1/1971 | Moore | 47/41.12 |
| 3,554,434 | 1/1971 | Anderson | 229/55 |
| 3,556,389 | 1/1971 | Gregoire | 229/53 |
| 3,557,516 | 1/1971 | Brandt | 53/14 |
| 3,620,366 | 11/1971 | Parkinson | 206/59 |
| 3,681,105 | 8/1972 | Milutin | 117/15 |
| 3,767,104 | 10/1973 | Bachman et al. | 229/7 |
| 3,793,799 | 2/1974 | Howe | 53/32 |
| 3,869,828 | 3/1975 | Matsumoto | 47/34.11 |
| 3,888,443 | 6/1975 | Flanigen | 248/152 |
| 3,962,503 | 6/1976 | Crawford | 428/40 |
| 4,043,077 | 8/1977 | Stonehocker | 47/66 |
| 4,054,697 | 10/1977 | Reed et al. | 428/40 |
| 4,091,925 | 5/1978 | Griffo et al. | 206/423 |
| 4,113,100 | 9/1978 | Soja et al. | 206/602 |
| 4,118,890 | 10/1978 | Shore | 47/28 |
| 4,189,868 | 2/1980 | Tymchuck et al. | 47/84 |
| 4,216,620 | 8/1980 | Weder et al. | 47/72 |
| 4,248,347 | 2/1981 | Trimbee | 206/423 |
| 4,265,049 | 5/1981 | Gorewitz | 47/26 |
| 4,280,314 | 7/1981 | Stuck | 53/241 |
| 4,297,811 | 11/1981 | Weder | 47/72 |
| 4,333,267 | 6/1982 | Witte | 47/84 |
| 4,347,686 | 9/1982 | Wood | 47/73 |
| 4,380,564 | 4/1983 | Cancio et al. | 428/167 |
| 4,400,910 | 8/1983 | Koudstall et al. | 47/84 |
| 4,413,725 | 11/1983 | Bruno et al. | 206/45.33 |
| 4,546,875 | 10/1985 | Zweber | 206/0.82 |
| 4,621,733 | 11/1986 | Harris | 206/423 |
| 4,640,079 | 2/1987 | Stuck | 53/390 |
| 4,717,262 | 1/1988 | Roen et al. | 383/120 |
| 4,733,521 | 3/1988 | Weder et al. | 53/580 |
| 4,765,464 | 8/1988 | Ristvedt | 206/0.82 |
| 4,771,573 | 9/1988 | Stengel | 47/67 |
| 4,773,182 | 9/1988 | Weder et al. | 47/72 |
| 4,801,014 | 1/1989 | Meadows | 206/423 |
| 4,810,109 | 3/1989 | Castel | 383/105 |
| 4,835,834 | 6/1989 | Weder | 29/525 |
| 4,941,572 | 7/1990 | Harris | 206/423 |
| 4,980,209 | 12/1990 | Hill | 428/34.1 |
| 5,073,161 | 12/1991 | Weder et al. | 493/154 |
| 5,074,675 | 12/1991 | Osgood | 383/122 |
| 5,105,599 | 4/1992 | Weder | 53/399 |
| 5,111,638 | 5/1992 | Weder | 53/397 |
| 5,120,382 | 6/1992 | Weder | 156/212 |
| 5,152,100 | 10/1992 | Weder et al. | 47/72 |
| 5,181,364 | 1/1993 | Weder | 53/397 |
| 5,199,242 | 4/1993 | Weder et al. | 53/397 |
| 5,205,108 | 4/1993 | Weder et al. | 53/397 |
| 5,228,234 | 7/1993 | de Klerk et al. | 47/41.01 |
| 5,235,782 | 8/1993 | Landau | 47/72 |
| 5,239,775 | 8/1993 | Landau | 47/72 |
| 5,249,407 | 10/1993 | Stuck | 53/399 |
| 5,259,106 | 11/1993 | Weder et al. | 29/469.5 |
| 5,307,606 | 5/1994 | Weder | 53/410 |
| 5,315,785 | 5/1994 | Avōt et al. | 47/72 |
| 5,350,240 | 9/1994 | Billman et al. | 383/104 |
| 5,353,575 | 10/1994 | Stepanek | 53/461 |
| 5,361,482 | 11/1994 | Weder et al. | 29/469 |
| 5,388,695 | 2/1995 | Gilbert | 206/423 |
| 5,428,939 | 7/1995 | Weder et al. | 53/397 |
| 5,443,670 | 8/1995 | Landau | 156/191 |
| 5,493,809 | 2/1996 | Weder et al. | 47/72 |
| 5,496,251 | 3/1996 | Cheng | 493/224 |
| 5,496,252 | 3/1996 | Gilbert | 493/224 |
| 5,526,932 | 6/1996 | Weder | 206/423 |
| 5,572,849 | 11/1996 | Weder et al. | 53/399 |
| 5,572,851 | 11/1996 | Weder | 53/399 |
| 5,575,133 | 11/1996 | Weder et al. | 53/397 |
| 5,617,703 | 4/1997 | Weder | 53/413 |
| 5,624,320 | 4/1997 | Martinez | 472/51 |
| 5,647,168 | 7/1997 | Gilbert | 47/72 |

FOREIGN PATENT DOCUMENTS

| | | |
|---|---|---|
| 345464 | 12/1921 | (DE) . |
| 513971 | 11/1930 | (DE) . |
| 1166692 | 3/1964 | (DE) . |
| 1962947 | 6/1971 | (DE) . |
| 2060812 | 11/1971 | (DE) . |
| 2748626 | 5/1979 | (DE) . |
| 3445799 | 6/1986 | (DE) . |
| 3829281 | 5/1989 | (DE) . |
| 3911847 | 10/1990 | (DE) . |
| 0050990 | 5/1982 | (EP) . |
| 0791543 | 8/1997 | (EP) . |
| 1376047 | 9/1964 | (FR) . |
| 2036163 | 12/1970 | (FR) . |
| 2137325 | 12/1972 | (FR) . |
| 2272914 | 12/1975 | (FR) . |
| 2489126 | 3/1982 | (FR) . |
| 2610604 | 8/1988 | (FR) . |
| 2603159 | 3/1989 | (FR) . |
| 2619698 | 3/1989 | (FR) . |
| 5605 | 5/1885 | (GB) . |
| 1204647 | 9/1970 | (GB) . |
| 2056410 | 3/1981 | (GB) . |
| 2074542 | 11/1981 | (GB) . |
| 2128083 | 4/1984 | (GB) . |
| 2252708 | 8/1992 | (GB) . |
| 224507 | 4/1996 | (IT) . |
| 542958 | 2/1993 | (JP) . |
| 8301709 | 12/1984 | (NL) . |
| 1000658 | 1/1996 | (NL) . |
| 9315979 | 8/1993 | (WO) . |

OTHER PUBLICATIONS

"Costa Keeps the Christmas Spirit", Supermarket Floral, Sep. 15, 1992.

"Super Seller", Supermarket Floral, Sep. 15, 1992.

"Halloween", Link Magazine, Sep. 1992, 2 pages.

"Now More Than Ever", Supermarket Floral, Sep. 15, 1992.

Le Plant Sac Advertisement, published prior to Sep. 26, 1987.

"A World of Cut Flower and Pot Plant Packaging" Brochure, Klerk's Plastic Products Manufacturing, Inc., published prior to Mar. 31, 1994, 6 pages.

Chantler & Chantler brochure showing Zipper Sleeve™ and Florasheet®, published prior to Mar. 31, 1994, 2 pages.

"Foil Jackets" brochure, Custom Medallion, Inc., Dec. 1996, 2 pages.

"Derwent Abstract" of FR 2610604A. It is noted that the abstract is an incorrect English translation of the contents of the French patent. The French patent does not enable or disclose adhesively attaching the covering to the container. 1988.

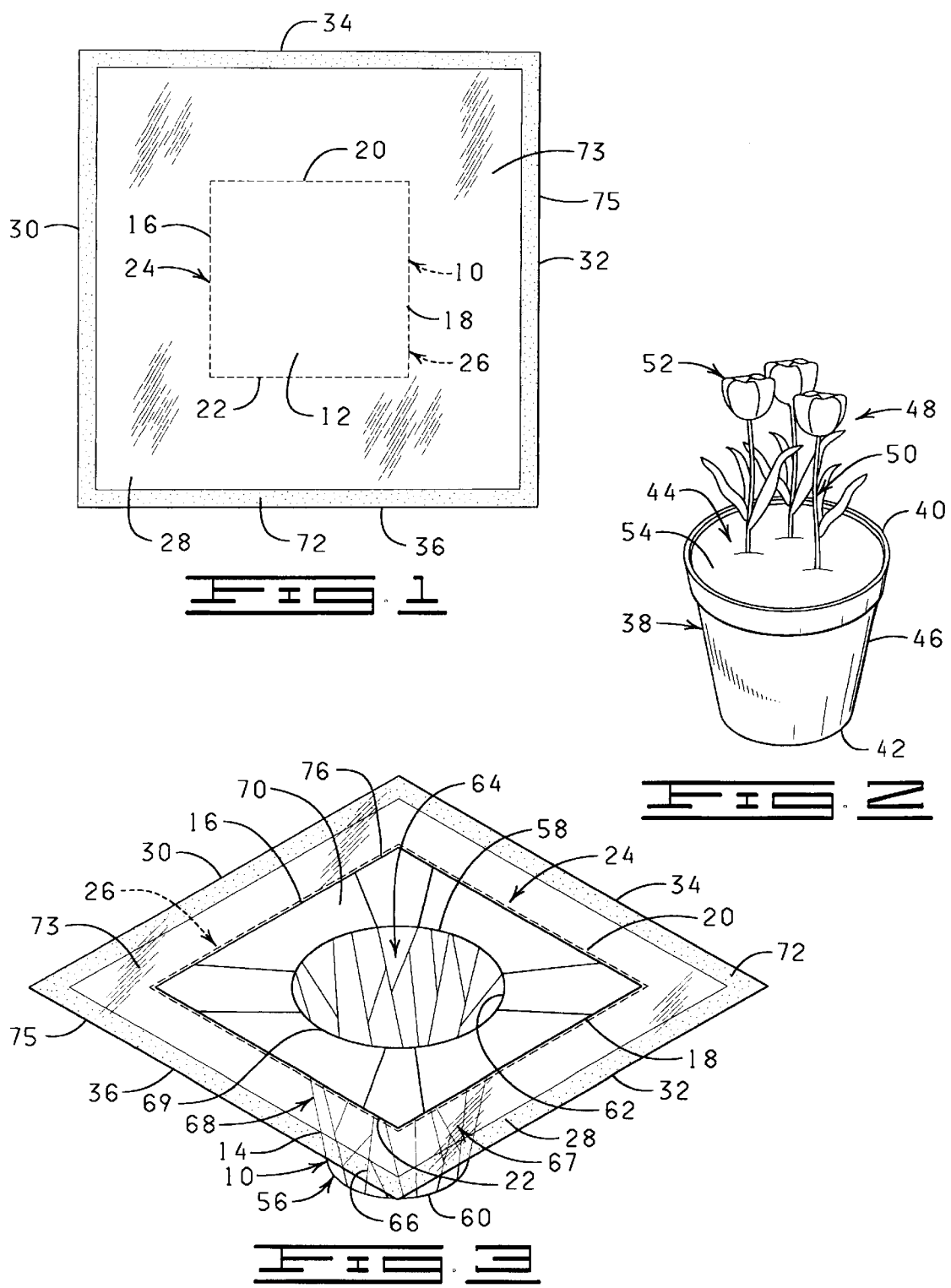

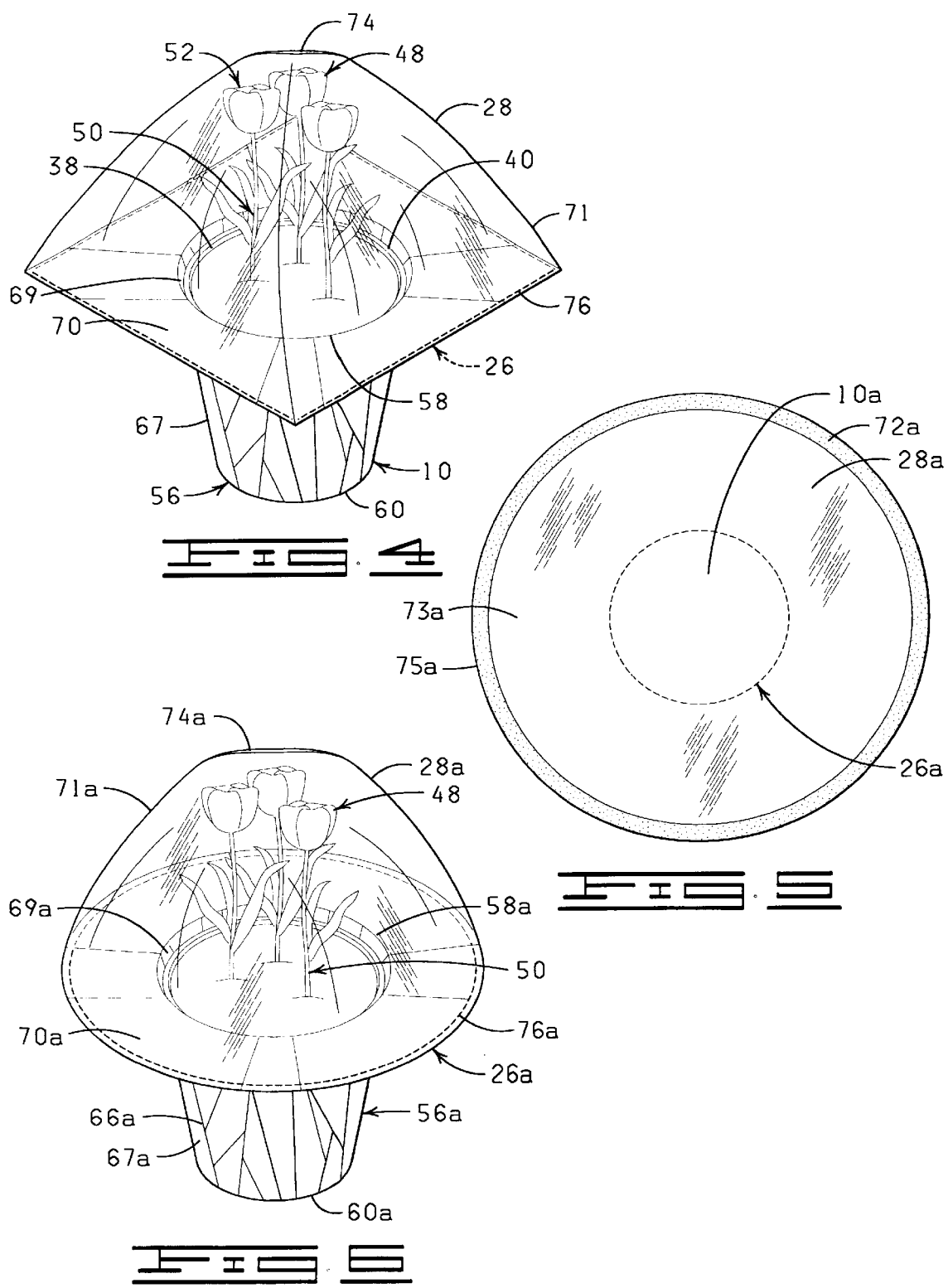

COVERING FOR FLOWER POT AND FLORAL GROUPING

CROSS-RELATED REFERENCES

This invention is a continuation of application U.S. Ser. No. 09/325,238, filed Jun. 3, 1999, entitled "COVERING FOR FLOWER POT AND FLORAL GROUPING", which is a continuation of U.S. Ser. No. 09/021,215, filed Feb. 10, 1998, entitled "COVERING FOR FLOWER POT AND FLORAL GROUPING" now U.S. Pat. No. 6,061,958, issued May 16, 2000 which is a continuation of U.S. Ser. No. 08/971,206, filed Nov. 14, 1997, entitled "COVERING FOR FLOWER POT AND FLORAL GROUPING", now U.S. Pat. No. 5,956,898, issued Sep. 28, 1999; which is a continuation of U.S. Ser. No. 08/526,335, filed Sep. 11, 1995, entitled "COVERING FOR FLOWER POT AND FLORAL GROUPING", now U.S. Pat. No. 5,699,648, issued Dec. 23, 1997; which is a continuation of U.S. Ser. No. 08/183,010, filed Jan. 14, 1994, entitled "COVERING FOR FLOWER POT AND FLORAL GROUPING", now U.S. Pat. No. 5,479,758, issued Jan. 2, 1996; which is a continuation of U.S. Ser. No. 08/001,001, filed Jan. 6, 1993, entitled "COVERING FOR FLOWER POT AND FLORAL GROUPING", now U.S. Pat. No. 5,307,606, issued May 3, 1994.

FIELD OF THE INVENTION

The present invention relates generally to coverings for flower pots and, more particularly, but not by way of limitation, to a covering for a flower pot having a sheet extension for extending about a floral grouping disposed in the flower pot.

BRIEF DESCRIPTION OF THE DRAWINGS

FIG. 1 is a plan view of a sheet of material with a sheet extension connected thereto constructed in accordance with the present invention.

FIG. 2 is a perspective view of a flower pot having a floral grouping disposed therein.

FIG. 3 is a perspective view of the sheet of material formed into a pot cover with the sheet extension connected thereto.

FIG. 4 is a partial perspective view showing the flower pot of FIG. 2 disposed in the pot cover of FIG. 3 with the sheet extension formed about the floral grouping.

FIG. 5 is plan view of a modified sheet of material with a modified sheet extension connected thereto.

FIG. 6 is a perspective view of the sheet of material of FIG. 5 formed into the pot cover and having the flower pot of FIG. 2 disposed in the pot cover with the sheet extension formed about the floral grouping.

DESCRIPTION OF THE PREFERRED EMBODIMENTS

Referring to FIG. 1, as shown therein and designated by the general reference numeral 10 is a sheet of material constructed in accordance with the present invention. The sheet of material 10 shown in FIG. 1 has an upper surface 12, a lower surface 14 (FIG. 3), a first end 16, a second end 18, a first side 20 and a second side 22. The ends 16 and 18 cooperate with the sides 20 and 22 to define an outer perimeter 24 of the sheet of material 10. The outer perimeter 24 of the sheet of material 10 is defined by perforations 26, as shown in FIGS. 1, 3 and 4.

As shown in FIGS. 1, 3 and 4, a sheet extension 28 is connected to the outer perimeter 24 of the sheet of material 10. As shown in FIGS. 1 and 3, the sheet extension 28 extends a distance outwardly from the outer perimeter 24 of the sheet of material 10. The sheet extension 28 has a first end 30, a second end 32, a first side 34 and a second side 36. A portion of the sheet extension 28 extends a distance outwardly from the first end 16 of the sheet of material 10 terminating with the first end 30 of the sheet extension 28. Another portion of the sheet extension 28 extends a distance outwardly from the second end 18 of the sheet of material 10 terminating with the second end 32 of the sheet extension 28. Yet another portion of the sheet extension 28 extends a distance outwardly from the first side 20 of the sheet of material 10 terminating with the first side 34 of the sheet extension 28. Still another portion of the sheet extension 28 extends a distance outwardly from the second side 22 of the sheet of material 10 terminating with the second side 36 of the sheet extension 28.

The sheet extension 28 cooperates with the sheet of material 10 to define a generally square or rectangularly shaped sheet with the perforations 26 being disposed in a central portion of the sheet and defining the outer perimeter 24 of the sheet of material 10. Preferably, the sheet of material 10 and the sheet extension 28 are unitary and formed from a single sheet or plies or multiple sheets one on top of the other which may or may not be laminated.

The sheet of material 10 and the sheet extension 28 are constructed from any suitable flexible material that is capable of being wrapped about a floral grouping and formed into the covering, as described herein. Preferably, the sheet of material 10 and the sheet extension 28 are constructed of a material selected from a group of materials consisting of paper, metal foil, cloth (natural or synthetic), denim, burlap or polymer film or combinations thereof.

The term "polymer film" as used herein means any polymer film. For example, but not by way of limitation, one polymer film is a polypropylene film. Another example of a polymer film, but not by way of limitation, is cellophane.

The sheet of material 10 and the sheet extension 28 have a thickness in a range from about 0.1 mil to about 30 mil. Preferably, the sheet of material 10 and the sheet extension 28 have a thickness in a range from about 0.1 mil to about 5 mil.

The sheet of material 10 and the sheet extension 28 may be any shape and a rectangular shape is shown in FIG. 1 only by way of example. The sheet of material 10 and the sheet extension 28 for example only may be square, rectangular, circular or any other geometric shape such as heart shaped for example only.

The sheet of material 10 and the sheet extension 28 may be constructed of a single layer of material or a plurality of layers of the same or different types of materials. Any thickness of the sheet of material 10 and the sheet extension 28 may be utilized in accordance with the present invention as long as the sheet of material 10 and the sheet extension 28 is wrappable about a floral grouping and formable into the covering, as described herein. The layers of material comprising the sheet of material 10 and the sheet extension 28 may be connected together or laminated or may be separate layers.

The covering of the present invention is particularly constructed to be used with a pot 38 (FIG. 2). The pot 38 has a top 40, a bottom 42 with an opening through the top 40 forming a receiving space 44 within the pot 38. The pot 38 also has an outer peripheral surface 46. As shown in FIG. 2, the pot 38 is generally cylindrically shaped. However, the pot 38 may be any shape as may be desired in a particular application.

A floral grouping 48 is disposed at least partially within the receiving space 44 of the pot 38, as shown in FIG. 2. The floral grouping 48 has a stem end 50 and a bloom end 52. In one embodiment as shown in FIG. 2, material such as soil 54 is disposed in the receiving space 44 and a portion of the stem end 50 extends into the soil 54. The floral grouping extends a distance upwardly from the top 40 of the pot 38 terminating with the bloom end 52.

"Floral grouping" as used herein means cut fresh flowers, artificial flowers, a single flower, other fresh and/or artificial plants or other floral materials and may include other secondary plants and/or ornamentation which add to the aesthetics of the overall floral grouping.

A decorative pattern, such as a color and/or an embossed pattern, and/or other decorative surface ornamentation may be applied to the upper surface 12 and/or the lower surface 14 of the sheet of material 10 or portions thereof including, but not limited to printed design, coatings, colors, flocking or metallic finishes. The sheet of material 10 also may be totally or partially clear or tinted transparent material. The sheet extension 28 is transparent, although a decorative pattern also may be applied to the sheet extension 28.

The sheet of material 10 with the sheet extension 28 connected thereto is placed between a male and a female die or other forming system and formed into a pot cover 56 (FIG. 3). As shown in FIGS. 3 and 4, the pot cover 56 has a top 58, a closed bottom 60 and a cover opening 62 (FIG. 3) formed through the top 58 and extending through the top 58 a distance toward the bottom 60 of the pot cover 56 providing a pot receiving space 64 (FIG. 3). The pot receiving space 64 is shaped and adapted to receive the pot 38.

The pot cover 56 has a plurality of overlapping folds 66 (FIG. 3) with each of the overlapping folds 66 extending at various distances and at various angles over an outer peripheral surface 68 (FIG. 3) of the pot cover 56 extending between the top 58 and the bottom 60. The overlapping folds 66 extend at various angles and over various distances over the outer peripheral surface 68.

The pot cover 56 includes a base portion 67 and a skirt portion 70. The base portion 67 has an upper end 69 and is dimensioned to encompass at least a portion of the outer peripheral surface 46 of the pot 38 when the pot 38 is disposed in the pot receiving space 64 of the pot cover 56. (FIGS. 3 and 4). The skirt portion 70 is connected to and extends from the upper end 69 of the base portion 67 radially outwardly with an outer perimeter 76 of the skirt portion 70 being formed by the outer perimeter 24 of the sheet of material 10. The perforations 26 extend along the outer perimeter 76 of the skirt portion 70 formed by the outer perimeter 24 of the sheet of material 10. The perforations may be angularly arranged, such as the perforations 26 shown in FIGS. 1, 3, and 4 which provide a non-linear outer perimeter 76 of the skirt portion 70, or the perforations may be curved, such as the perforations 26a shown in FIGS. 5 and 6 which provide a curved outer perimeter 76a of the skirt portion 70a.

The overlapping folds 66 may be connected or at least partially connected. The connection of the overlapping folds 66 may be accomplished by using heat sealing material and heat sealing the overlapping folds 66 or by adhesively or cohesively connecting the overlapping folds 66.

A pot cover constructed in the manner just described with respect to the pot cover 56 and a system for forming such a pot cover is disclosed in U.S. Pat. No. 4,773,182, entitled, Article Forming System, issued to Weder, et al, Sep. 27, 1988, and the disclosure of this patent specifically hereby is incorporated herein by reference.

The pot 38 is placed in the pot receiving space 64 and positioned in the pot cover 56 such that the bottom 42 of the pot 38 is disposed generally adjacent the bottom 60 of the pot cover 56. The base portion 67 of the pot cover 56 substantially encompasses the entire outer peripheral surface 46 of the pot 38 including the bottom 42. The base portion 67 of the pot cover 56 extends from the bottom 42 to the top 40 of the pot 38. The skirt portion 70 extends radially outwardly from the upper end 69 of the base portion 67.

After the pot 38 has been placed in the pot cover 56, the sheet extension 28 forms an upper sleeve portion 71 which extends upwardly from the skirt portion 70 of the pot cover 56 and is detachable therefrom. The upper sleeve portion 71 is formed about the floral grouping 48 to a position wherein the upper sleeve portion 71 covers and encompasses a substantial portion of the floral grouping 48 including the bloom end 52 of the floral grouping 48.

The upper sleeve portion 71 preferably includes a bonding material 72 (FIG. 1) disposed on an upper surface 73 of the upper sleeve portion 71 and extending about an outer perimeter 75 of the upper sleeve portion 71. After the upper sleeve portion 71 has been formed about the floral grouping 48, at least a portion of the outer perimeter 75 of the upper sleeve portion 71 is bonded together to provide a closed end 74 of the upper sleeve portion 71 of the pot cover 56 wherein the closed end 74 is disposed above the bloom end of the floral grouping 48 (FIG. 4).

The term "bonding material" as used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material and, in this instance, heat also must be applied to effect the sealing. The term "bonding material" as used herein means any type of material or thing which can be used to effect the bonding or connecting of the two adjacent portions of the material or sheet of material to effect the connection or bonding described herein. The term "bonding material" also includes labels, bands, ribbons, strings, tape, staples or combinations thereof.

The upper sleeve portion 71 remains in a position extending about the floral grouping 48 until it is desired to remove the upper sleeve portion 71. The upper sleeve portion 71 is removed from the pot cover 56 by tearing along the perforations 26 separating the upper sleeve portion 71 from the pot cover 56. The upper sleeve portion 71 then is removed from the skirt portion 70 of the pot cover 56, thereby exposing at least a portion of the floral grouping 48 and providing a decorative cover (not shown) for the pot 38.

In addition to the perforations 26, the upper sleeve portion 71 also may include perforations extending between the perforations 26 and the outer perimeter 75 of the upper sleeve portion 71 to further assist in the removal of the upper sleeve portion 71 when it is no longer desired to keep the upper sleeve portion 71 extending about the floral grouping 48.

EMBODIMENT OF FIGS. 5 AND 6

Shown in FIGS. 5 and 6 is a sheet of material 10a having a sheet extension 28a connected thereto. The sheet of material 10a and the sheet extension 28a are constructed exactly like the sheet of material 10 and the sheet extension 28 shown in FIGS. 1, 3 and 4 and described in detail before, except the sheet of material 10a is circularly shaped having a circularly shaped outer perimeter 24a and the sheet extension 28a is circularly shaped having a circularly shaped outer perimeter.

The sheet of material 10a is formed into a pot cover 56a (FIG. 6) in a manner exactly like that described before with respect to the pot cover 56 (FIGS. 3 and 4), except the pot cover 56a has a skirt portion 70a with a circularly shaped appearance and a circularly shaped outer perimeter 76a defined by the circularly shaped outer perimeter 24a of the sheet of material 10a. The sheet extension 28a forms an upper sleeve portion of the pot cover 56a which extends a distance outwardly from the skirt portion 70a and also has a circularly shaped outer perimeter, as mentioned before.

The upper sleeve portion 71a is formed about the floral grouping 48 in a manner like that described before and secured via the bonding material 72a to provide the closed end 74a.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A flexible covering for a pot having a floral grouping disposed therein, the pot having a top, a bottom and an outer peripheral surface, and the floral grouping having a stem end and a bloom end with a portion of the stem end of the floral grouping extending into the pot, the flexible covering comprising:
   a pot cover having a top, a closed bottom and a cover opening extending through the top a distance toward the closed bottom of the pot cover, the pot cover comprising:
      a base portion dimensioned to encompass at least a portion of the outer peripheral surface of the Pot when the pot is disposed within the base portion of the pot cover, the base portion having an upper end; and
      a skirt portion connected to the upper end of the base portion and extending therefrom;
   a detachable upper sleeve portion extending upwardly from the skirt portion of the pot cover such that when the pot containing a floral grouping is disposed within the base portion of the pot cover, the detachable upper sleeve portion covers and encompasses a substantial portion of the floral grouping;
   a bonding material disposed on at least a portion of the detachable upper sleeve portion such that when the detachable upper sleeve portion is positioned about the floral grouping, when the pot containing the floral grouping is disposed in the pot cover, at least a portion of the detachable upper sleeve portion is connected via the bonding material to provide a closed end of the detachable upper sleeve portion with the closed end being disposed above the bloom end of the floral grouping; and
   wherein when the detachable upper sleeve portion is detached from the skirt portion of the pot cover, at least a portion of the floral grouping is exposed when the pot containing the floral grouping is disposed in the pot cover.

2. A flexible covering for a pot having a floral grouping disposed therein, the pot having a top, a bottom and an outer peripheral surface, and the floral grouping having a stem end and a bloom end with a portion of the stem end of the floral grouping extending into the pot, the flexible covering comprising:
   a pot cover having a top, a closed bottom and a cover opening extending through the top a distance toward the closed bottom of the pot cover, the pot cover comprising:
      a base portion dimensioned to encompass at least a portion of the outer peripheral surface of the pot when the pot is disposed within the base portion of the pot cover, the base portion having an upper end; and
      a skirt portion connected to the upper end of the base portion and extending therefrom; and
   a detachable upper sleeve portion extending upwardly from the skirt portion of the pot cover such that when the pot containing a floral grouping is disposed within the base portion of the pot cover, the detachable upper sleeve portion covers and encompasses a substantial portion of the floral grouping.

3. A flexible covering for a pot having a floral grouping disposed therein, the pot having a top, a bottom and an outer peripheral surface, and the floral grouping having a stem end and a bloom end with a portion of the stem end of the floral grouping extending into the pot, the flexible covering comprising:
   a pot cover having a top, a closed bottom and a cover opening extending through the top a distance toward the closed bottom of the pot cover, the pot cover comprising:
      a base portion dimensioned to encompass at least a portion of the outer peripheral surface of the pot when the pot is disposed within the base portion of the pot cover, the base portion having an upper end; and
      a skirt portion connected to the upper end of the base portion and extending therefrom;
   a detachable upper sleeve portion extending upwardly from the skirt portion of the pot cover such that when the pot containing a floral grouping is disposed within the base portion of the pot cover, the detachable upper sleeve portion covers and encompasses a substantial portion of the floral grouping; and
   a bonding material disposed on at least a portion of the detachable upper sleeve portion such that when the detachable upper sleeve portion is positioned about the floral grouping when the pot containing the floral grouping is disposed in the pot cover, at least a portion of the detachable upper sleeve portion is connected via the bonding material to provide a closed end of the detachable upper sleeve portion with the closed end being disposed above the bloom end of the floral grouping.

4. A flexible covering for a pot having a floral grouping disposed therein, the pot having a top, a bottom and an outer peripheral surface, and the floral grouping having a stem end and a bloom end with a portion of the stem end of the floral grouping extending into the pot, the flexible covering comprising:
   a pot cover having a top, a closed bottom and a cover opening extending through the top a distance toward the closed bottom of the pot cover, the pot cover comprising:

a base portion dimensioned to encompass at least a portion of the outer peripheral surface of the pot when the pot is disposed within the base portion of the pot cover, the base portion having an upper end; and a skirt portion connected to the upper end of the base portion and extending therefrom;

a detachable upper sleeve portion extending upwardly from the skirt portion of the pot cover such that when the pot containing a floral grouping is disposed within the base portion of the pot cover, the detachable upper sleeve portion covers and encompasses a substantial portion of the floral grouping; and wherein when the detachable upper sleeve portion is detached from the skirt portion of the pot cover, at least a portion of the floral grouping is exposed when the pot containing the floral grouping is disposed in the pot cover.

\* \* \* \* \*